US009968940B2

(12) United States Patent
Hartmann et al.

(10) Patent No.: US 9,968,940 B2
(45) Date of Patent: May 15, 2018

(54) FOOD WASTE DISPOSER SYSTEM AND STOPPER FOR FOOD WASTE DISPOSER SYSTEM

(71) Applicant: Emerson Electric Co., St. Louis, MO (US)

(72) Inventors: Thomas Hartmann, Menomonee Falls, WI (US); Nicholas J. Hirsch, Wind Lake, WI (US); Thomas R. Berger, Racine, WI (US); Jiming Sun, Shanghai (CN)

(73) Assignee: EMERSON ELECTRIC CO., St. Louis, MO (US)

( * ) Notice: Subject to any disclaimer, the term of this patent is extended or adjusted under 35 U.S.C. 154(b) by 395 days.

(21) Appl. No.: 14/831,974

(22) Filed: Aug. 21, 2015

(65) Prior Publication Data

US 2016/0053473 A1 Feb. 25, 2016

Related U.S. Application Data

(60) Provisional application No. 62/041,305, filed on Aug. 25, 2014.

(51) Int. Cl.
*B02C 18/24* (2006.01)
*E03C 1/266* (2006.01)
(Continued)

(52) U.S. Cl.
CPC .......... *B02C 18/24* (2013.01); *B02C 18/0084* (2013.01); *B02C 18/0092* (2013.01);
(Continued)

(58) Field of Classification Search
CPC . B02C 18/24; B02C 18/0084; B02C 18/0092; E03C 1/2665; H02J 5/005
(Continued)

(56) References Cited

U.S. PATENT DOCUMENTS 3,207,837 A 9/1965 Brezosky
4,050,636 A * 9/1977 Possell .................. E03C 1/2665 241/46.013
(Continued)

FOREIGN PATENT DOCUMENTS

EP 2248608 A1 11/2010

OTHER PUBLICATIONS

Invitation to Pay Additional Fees and, Where Applicable, Protest Fees, for PCT/US2015/046276, dated Nov. 10, 2015.
(Continued)

*Primary Examiner* — Faye Francis
(74) *Attorney, Agent, or Firm* — Harness, Dickey & Pierce, P.L.C.

(57) ABSTRACT

A food waste disposer system has a food waste disposer and a rechargeable power source that provides power to a motor of the food waste disposer. In an aspect, the motor is a permanent magnet DC motor having a nominal no-load speed in the range of 15,000 revolutions per minute to 30,000 revolutions per minute and the motor section includes a gear reduction mechanism. In an aspect, the food waste disposer system includes a power module that communicates wirelessly with a wireless activator. In an aspect, a stopper receivable in an inlet of the food waste disposer includes or is couplable to a power source which in an aspect is a rechargeable power source and in an aspect, is disposed in a housing of the stopper. In an aspect, the stopper includes a cord for coupling the stopper to the power source which is a source of AC power.

27 Claims, 9 Drawing Sheets

(51) Int. Cl.

| | |
|---|---|
| ***B02C 18/00*** | (2006.01) |
| ***B02C 25/00*** | (2006.01) |
| ***H02J 5/00*** | (2016.01) |
| *B02C 18/16* | (2006.01) |

(52) U.S. Cl.
CPC ............ *B02C 25/00* (2013.01); *E03C 1/2665* (2013.01); *H02J 5/005* (2013.01); *B02C 2018/164* (2013.01)

(58) Field of Classification Search
USPC ..................................................... 241/46.013
See application file for complete search history.

(56) References Cited

U.S. PATENT DOCUMENTS

| | | | |
|---|---|---|---|
| 4,214,324 | A | 7/1980 | Kemper et al. |
| 4,928,890 | A | 5/1990 | Swisher, Jr. |
| 5,390,865 | A | 2/1995 | Vandermolen et al. |
| 6,439,487 | B1 | 8/2002 | Anderson et al. |
| 6,648,252 | B2 | 11/2003 | Strutz |
| 7,360,729 | B2 | 4/2008 | Anderson et al. |
| 7,578,460 | B2 | 8/2009 | Berger |
| 7,891,591 | B1 | 2/2011 | Hodgson et al. |
| 2002/0104909 | A1 | 8/2002 | Strutz |
| 2002/0170990 | A1 | 11/2002 | Anderson et al. |
| 2005/0236502 | A1 | 10/2005 | Anderson et al. |
| 2006/0011759 | A1 | 1/2006 | Chavez |
| 2007/0290084 | A1 | 12/2007 | Ootsuka et al. |
| 2008/0116305 | A1 | 5/2008 | Hanson et al. |
| 2009/0194624 | A1 | 8/2009 | Knueven et al. |
| 2012/0001003 | A1 | 1/2012 | Davis |
| 2012/0126045 | A1 | 5/2012 | Bradley et al. |
| 2013/0048768 | A1 | 2/2013 | Berger |
| 2014/0070036 | A1 | 3/2014 | Hammer |
| 2014/0339345 | A1 | 11/2014 | Hirsch et al. |

OTHER PUBLICATIONS

Notification of Transmittal of the International Search Report and Written Opinion of the International Searching Authority for PCT/US2015/046276 dated Mar. 8, 2016.

* cited by examiner

FOOD WASTE DISPOSER SYSTEM AND STOPPER FOR FOOD WASTE DISPOSER SYSTEM

CROSS-REFERENCE TO RELATED APPLICATIONS

This application claims the benefit of U.S. Provisional Application No. 62/041,305 filed on Aug. 25, 2014. The entire disclosure of the above application is incorporated herein by reference.

FIELD

The present disclosure relates generally to food waste disposers, and more particularly, to a food waste disposer system with a rechargeable power source. It also relates to a stopper receivable in an inlet of a food waste disposer that includes or is couplable to a power source.

BACKGROUND

This section provides background information related to the present disclosure, which is not necessarily prior art.

A food waste disposer of the type that is disposed underneath a sink and is mounted to a drain opening of the sink typically includes a food conveying section, a motor section and a grind section. The grind section is disposed between the food conveying section and the motor section. The food conveying section conveys food waste and water to the grind section. The grind section receives and grinds the food waste and the ground food waste is discharged through a discharge opening to a tailpipe.

The grind section typically includes a grind mechanism with a rotating shredder plate assembly and a stationary grind ring. The shredder plate assembly is connected to a shaft of an electric motor of the motor section and includes a shredder plate with one or more lugs, typically one or more pairs of lugs. The lugs may include fixed lugs that are fixed to the shredder plate, rotatable lugs (also called swivel lugs) that are rotatably fastened to the shredder plate and are free to rotate thereon, or both. The shredder plate is rotated relative to the grind ring via the electric motor. The grind ring is typically mounted in a housing and includes multiple spaced teeth.

During operation of the food waste disposer, the food waste that is directed from the food conveying section to the grind section is forced by the lugs against the grind ring to comminute the food waste. When the lugs are swivel lugs, rotation of the shredder plate creates a centrifugal force that acts upon the lugs and enhances comminution of the food waste between the lugs and the grind ring. The sharp edges of the teeth grind the food waste into particulate matter (or ground matter). When the food waste is sufficiently ground, the food waste passes through gaps between the shredder plate and the grind ring and enters a discharge area in an upper end bell as a food waste/water slurry. It is then discharged out a discharge outlet in the upper end bell through a tail pipe to a drain line of household plumbing.

Typically, food waste disposers operate off household power and require access to the household power in the sink cabinet. In a typical installation, the food waste disposer is wired to household power through a wall switch that is used to turn the food waste disposer on and off. Alternatively, when the food waste disposer is a batch feed disposer, the wall switch can be replaced by an activation means located in the stopper used with the batch feed disposer. In another alternative, an air switch mounted on the sink deck or countertop, or wireless remote control, can be used instead of the wall switch to turn the food waste disposer on and off. However, these alternatives still require a connection to household power in the sink cabinet.

A battery powered food waste disposer eliminates the need to wire the food waste disposer to household power. Although the battery charger needs to be plugged into household power, the battery charger can be located away from the food waste disposer and be plugged into household power. An example of a prior art battery powered food waste disposer is disclosed in US Pub. No. 2013/0048768 ("'768 Pat. Pub.") for a "Battery Powered Food Waste Disposer."

With reference to FIGS. 1 and 2 (which are FIGS. 1 and 2 of the '768 Appln.) a food waste disposer 10 is shown. The food waste disposer 10 includes a grind and discharge section 13 disposed between a food conveying section 16 and a motor section 18. The grind and discharge section 13 includes a grind section 14 and a discharge section 15. The grind section 14 includes a grind mechanism 19 with a stationary grind ring 20 and a rotatable shredder plate assembly 22. The rotatable shredder plate assembly includes a shredder plate 48 on which lugs 30 are rotatably fastened. Lugs 30 are illustratively swivel lugs, but it should be understood that they could be fixed lugs, or include both swivel lugs and fixed lugs.

The grind section 14 includes a grind housing 26 that encompasses the grind mechanism 19. The grind housing 26 may be fastened to an upper end bell (UEB) 28 of the discharge section 15 and holds the grind ring 20. The grind ring 20 is mounted in a fixed (stationary) position within the grind housing 26. The grind ring 20 includes teeth 29. The grind ring 20 may be fixedly affixed to an inner surface of the grind housing 26 by an interference fit and may be composed, for example, of galvanized steel.

The food conveying section 16 includes an inlet housing 31 with a first inlet 32. The first inlet 32 receives food waste and water. The inlet housing 31 may be a metal housing or an injection molded plastic housing. The inlet housing 31 also includes a second inlet 33 for receiving water discharged from a dishwasher (not shown). The inlet housing 31 may be integrally formed with the grind housing 26, such as by injection-molding both of the housings 26, 31 as a single component.

The motor section 18 includes a motor 34 having a rotor 38 and a stator 44. Rotor 38 rotates in stator 44 imparting rotational movement to a rotor shaft 36 of a rotor 38. Motor 34 is illustratively a direct current motor. By way of example, motor 34 may be a permanent magnet DC motor, a brushless DC motor, or a universal motor. The motor 34 is enclosed within a motor housing 40. The motor housing 40 has a frame 42. The rotor shaft 36 is connected to and rotates the rotatable shredder plate assembly 22 within the grind ring 20.

A battery 50 is coupled to food waste disposer 10 to provide power to motor 34. Battery 50 is illustratively coupled to motor 34 through control circuit 52. Battery 50 may be by way of example a removable battery pack, and may illustratively be a rechargeable battery pack.

A battery operated food waste disposer in accordance with the above aspect would not require access to household power and could be installed in sinks where there is no household power available under the sink. By using a removable, rechargeable battery pack for battery 50, one such battery pack can be used to power food waste disposer 10 while another such battery pack is being recharged.

FIG. 2 is a simplified schematic of control circuit 52 that couples battery 50 to motor 34. Control circuit 52 may simply be a switch, such as an air switch. Control circuit 52 may also be a remotely controlled switching circuit activated by a remote controller (not shown), such as a wireless remote controller.

During operation of the food waste disposer 10, the shredder plate assembly 22 is rotated by motor 34. Due to the rotation of the shredder plate assembly 22, lugs 30 force the food waste against the teeth 29 of grind ring 20 to grind the food waste into small particulate matter. A slurry of the particulate matter and water passes from the shredder plate assembly 22, outside a periphery of shredder plate 48, through gaps 49 between the teeth 29 to a discharge area below the shredder plate assembly 22 and in the UEB 28. It is then discharged out a discharge outlet of UEB 28 through tailpipe 24 to a drain line (not shown).

SUMMARY

This section provides a general summary of the disclosure, and is not a comprehensive disclosure of its full scope or all of its features.

In accordance with an aspect of the present disclosure, a food waste disposer system has a food waste disposer and a rechargeable power source that provides power to a motor of the food waste disposer. The food waste disposer includes a food conveying section, a motor section that includes the motor and a grind and discharge section. The food conveying section conveys food waste to a grind section of the grind and discharge section. The grind section includes a grind mechanism. The grind mechanism includes a rotatable shredder plate assembly that is rotated by the motor of the motor section. The motor comprises a permanent magnet direct current motor having a nominal no-load speed in the range of 15,000 revolutions per minute to 30,000 revolutions per minute. The motor section includes a gear reduction mechanism coupling the rotor shaft to the rotatable shredder plate assembly. The gear reduction mechanism has an input/output gear reduction ratio in a range of 4.3-30 to 1. The nominal no-load speed of the motor and the input/output gear reduction ratio of the gear reduction mechanism are configured so that a speed at which an output shaft of the gear reduction mechanism rotates is in a range of 1,000 revolutions per minute to 3,500 revolutions per minute when the motor is running at its nominal no-load speed.

In an aspect, the gear reduction mechanism includes an impact mechanism. In an aspect, the impact mechanism is configured to activate when the rotating shredder plate assembly is stopped in a jam condition.

In an aspect, a flywheel is disposed between and coupled to the gear reduction mechanism and the rotatable shredder plate assembly.

In an aspect, the gear reduction mechanism is an angled gear reduction mechanism and the motor is offset to a side of the food waste disposer at a right angle to the output shaft of the gear reduction mechanism. In an aspect, the gear reduction mechanism is a right angle gear reduction mechanism.

In an aspect, the permanent magnet direct current motor is any of a motor type having a wound rotor and a stator with permanent magnets and a brushless direct current motor having a wound stator and a rotor with permanent magnets.

In an aspect, the rechargeable power source is at least one of a battery, ultra-capacitor and an ultra-capacitor battery hybrid.

In an aspect, the food waste disposer system includes a wireless charger coupled to the rechargeable power source.

In an aspect, the food waste disposer system includes a power module and a wireless activator. The power module is wired to the motor and the power module has the rechargeable power source received therein. The power module further has a wireless communication unit and the wireless activator includes a wireless communication unit with the wireless communications unit of the wireless activator and the wireless communications unit of the power module in wireless communication with each other. The wireless activator includes an on/off switch. The power module turns the food waste disposer on and off in response to actuation of the on/off switch of the wireless activator wherein upon the on/off switch of the wireless activator being actuated, the wireless communication unit of the wireless activator communicates wirelessly with the wireless communication unit of the power module to send a message that the on/off switch of the wireless activator was actuated. In an aspect, the power module is disposed remotely from the food waste disposer. In an aspect, the power module is mounted on or in the food waste disposer.

In an aspect, if the food waste disposer is off when the on/off switch of the wireless activator is actuated, the power module determines if a reset is required and upon determining that a reset is required, sends a message to the wireless activator that the reset is required. The wireless activator illuminates a reset indicator upon receipt of the message that the reset is required and the power module does not turn the food waste disposer on. In an aspect, upon determining that the reset is not required, the power module measures a voltage level of the rechargeable power source and determines whether the voltage level of the rechargeable power source is sufficient to run the food waste disposer and turns the food waste disposer on only if the voltage level of the rechargeable power source is sufficient to run the food waste disposer. In an aspect, after turning the food waste disposer on, the power module turns the food waste disposer off upon the on/off switch of the wireless activator being actuated or after a lapse of a predetermined period time.

In an aspect, the on/off switch is an on/off button and the power module toggles the food waste disposer on and off in response to the on/off button being pressed.

In an aspect, the wireless activator includes a rechargeable power source voltage level display and upon turning the food waste disposer off, the power module sends the measured rechargeable power source voltage level to the wireless activator and the wireless activator displays the measured rechargeable power source voltage on the rechargeable power source voltage level display. In an aspect, the power module also includes a rechargeable power source voltage level display on which it displays the measured rechargeable power source voltage level. In an aspect, the wireless activator includes a single light display instead of the voltage level display and the single light display is lit only when the voltage level of the rechargeable power source is at a level that a recharge of the rechargeable power source is needed.

In an aspect, the power module also includes an on/off switch and the power module also turns the food waste disposer on and off upon the on/off switch of the power module being actuated. In an aspect, the on/off switch of the power module is an on/off button and the power module toggles the food waste disposer on and off in response to the on/off button being pressed.

In an aspect, the rechargeable power source is removably receivable in the power module.

In an aspect, the food waste disposer system includes a stopper receivable in an inlet housing of the food conveying section. The stopper is includes or is couplable to a power source that provides power to the motor of the food waste disposer when the stopper is received in the inlet of the food waste conveying section. In an aspect, the power source is a rechargeable power source and in an aspect is disposed in a housing of the stopper. In an aspect wherein the power source is a rechargeable power source, the motor of the motor section is any type of direct current motor and in an aspect, the motor section does not have the gear reduction mechanism. In an aspect, the rechargeable power source is at least one of a battery, an ultra-capacitor and an ultra-capacitor battery hybrid. In an aspect, the source of power is a source of AC power and the stopper includes a cord that couples the stopper to the source of AC power. In an aspect where the power source is a source of AC power, the motor of the motor section is an AC motor or a DC motor. In the aspect where the motor is a DC motor, either the stopper or the food waste disposer includes a DC power supply that is coupled to the source of AC power when the stopper is received in the inlet hosing of the food conveying section. In an aspect, when the motor is an AC motor it is an AC induction motor.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Other objects and advantages of the invention will become apparent upon reading the following detailed description and upon reference to the drawings in which:

Corresponding reference numerals indicate corresponding parts throughout the several views of the drawings.

With reference to FIG. 3 a food waste disposer system 301 in accordance with an aspect of the present disclosure is shown. Food waste disposer system 301 includes a food waste disposer 300 that has many of the same components as food waste disposer 10 which are identified with the same reference numbers, and the following discussion focuses on the differences. The food waste disposer 300 includes grind and discharge section 13 disposed between food conveying section 16 and motor section 18. The grind and discharge section 13 includes a grind section 14 and a discharge section 15. The grind section 14 includes a grind mechanism 19 with a stationary grind ring 20 and a rotatable shredder plate assembly 22.

Figure 1:
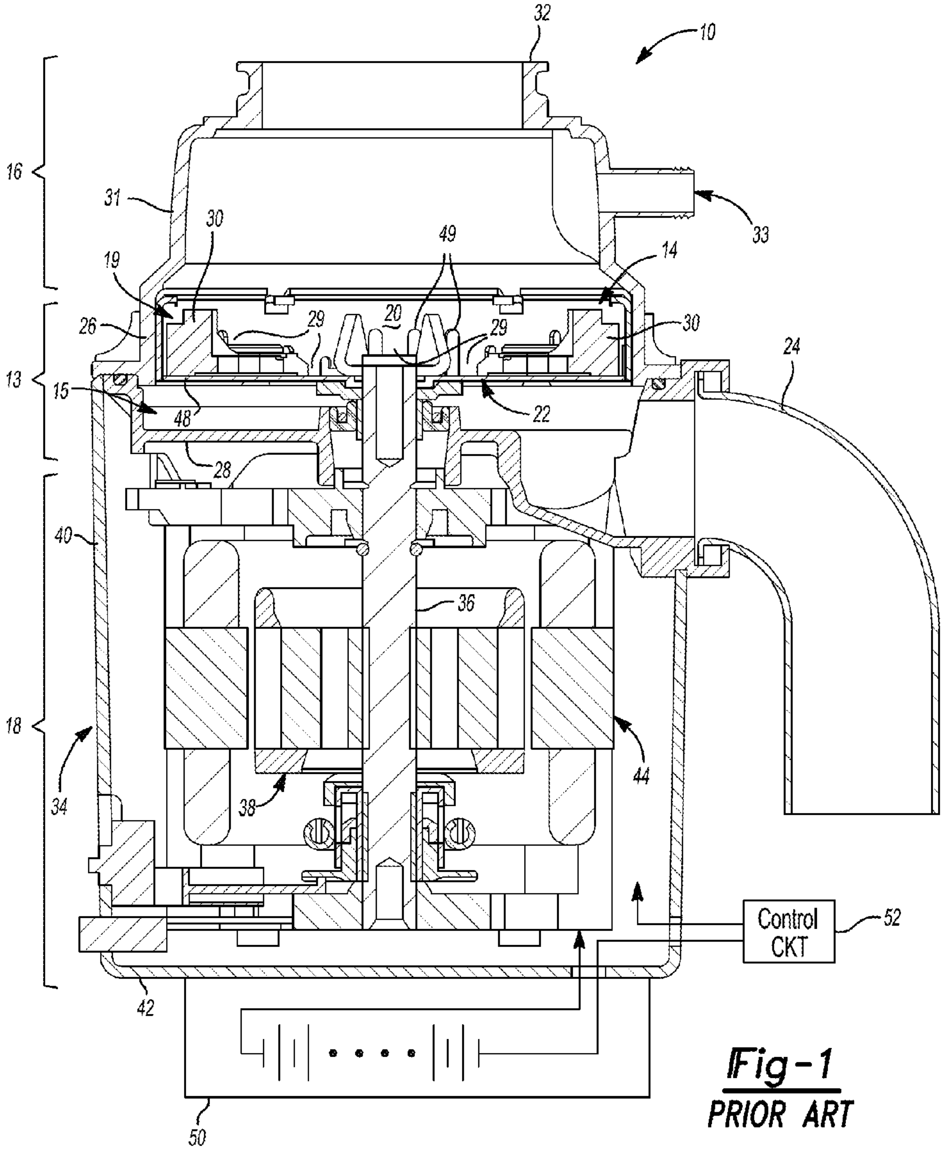
Fig-1 PRIOR ART
FIG. 1 is a sectional view of a prior art battery powered food waste disposer in accordance with an aspect of the present disclosure.

A trim shell 302 surrounds inlet housing 31, grind housing 26 and motor 34. In an aspect, sound insulation (not shown) is disposed between trim shell 302 and one or more of inlet housing 31 and grind housing 26. In an aspect, sound insulation (not shown) is disposed between motor 34 and a motor cover 303. In an aspect, motor cover 303 includes sound reducing features such as baffles to break up standing waves and reduce sound radiation from motor 34 and/or a gear reduction mechanism 308 (discussed below). In an aspect, motor cover 303 is part of trim shell 302. In an aspect, trim shell 302 includes cap 304 disposed mainly around inlet housing 31, a central trim shell 306 disposed mainly around a lower part of inlet housing 31 and grind housing 26. In an aspect, trim shell 302 includes three parts, cap 304 central trim shell 306 and motor cover 303. Food waste disposer system 301 includes a rechargeable power source 312 that powers food waste disposer 300. In an aspect, rechargeable power source 312 is a battery such as battery 50. It should be understood that rechargeable power source 312 can be other than a battery as discussed below.

Motor section 18 includes gear reduction mechanism 308 coupling rotor shaft 36 to rotatable shredder plate assembly 22. In an aspect, motor 34 of motor section 18 is a high speed permanent magnet DC motor having a nominal no-load speed in the range of 15,000 RPM to 30,000 RPM. Gear reduction mechanism 308 has an input/output gear reduction ratio in the range of 4.3-30 to 1. The nominal no-load speed of the motor 34 and the input/output ratio of the gear reduction mechanism 308 are configured so that the RPM of an output shaft 310 of gear reduction mechanism 308 will be in a range of about 1,000 RPM to 3,500 RPM so that when food waste disposer 300 is running at no load with motor 34 running at its nominal no-load speed, the rotatable shredder plate assembly 22 will be rotating at an RPM in the range of about 1,000 RPM to 3,500 RPM, preferably in the range of about 1,800 RPM to 2,500 RPM which is the typical speed at which the rotating shredder plate of a household food waste dispose powered by household current rotates. The high speed permanent magnet DC motor is a more efficient motor compared to an induction motor and the high speed DC motor develops the required torque at a much higher RPM than an induction motor. By coupling such a high speed motor to the rotating shredder plate assembly 22 with gear reduction mechanism 308, sufficient torque is provided to rotatable shredder plate assembly 22 with an acceptable interval between charges of rechargeable power source 312 which powers motor 34. In an aspect, high speed permanent magnet motor 34 is a high speed DC motor having a stator with permanent magnets and a wound rotor having a commutator against which brushes ride through which power is provided to the rotor. It should be understood that motor 34 could alternatively be a brushless DC motor having a wound stator and a rotor with permanent magnets.

Figure 4:
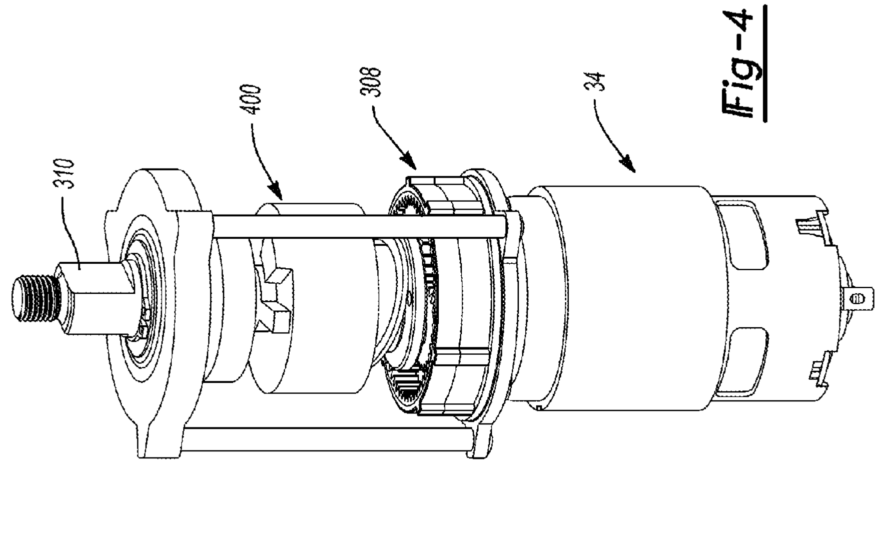
FIG. 4 is perspective view of a motor and gear reduction mechanism having an impact mechanism for use in the food waste disposer of FIG. 3 in accordance with an aspect of the present disclosure.

With reference to FIG. 4, in an aspect, gear reduction mechanism 308 includes an impact mechanism 400. Illustratively, impact mechanism 400 is a spring loaded impact mechanism of the type used in many impact drivers. As is known in the art, this type of impact mechanism has a hammer coupled to an input shaft that retractably engages an anvil coupled to an output shaft. A spring is attached to the hammer which retracts the hammer from the anvil when load on the output shaft reaches a predetermined level. The spring then releases the hammer which reengages the anvil hitting the anvil with a rotational impact force. Impact mechanism 400 is illustratively configured to activate when the rotating shredder plate assembly 22 is stopped in a jam condition, typically caused by food waste jamming between lugs (not shown) of rotatable shredder plate assembly 22 and stationary grind ring 20. The hammer action provided by impact mechanism 400 will facilitate breaking the jam. Illustratively, a spring rate of impact mechanism 400 is adjusted so that impact mechanism activates at a torque just below a stall torque of motor 34.

Figure 3:
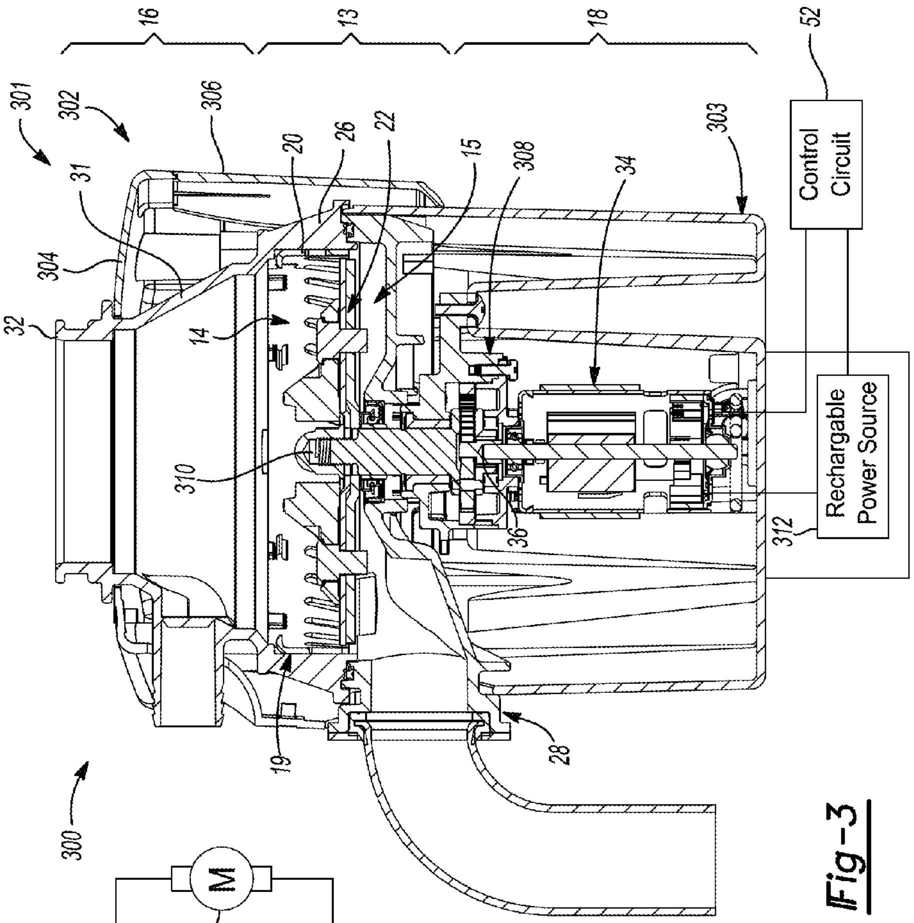
FIG. 3 is sectional view of a food waste disposer with rechargeable power source in accordance with an aspect of the present disclosure.
Figure 2:
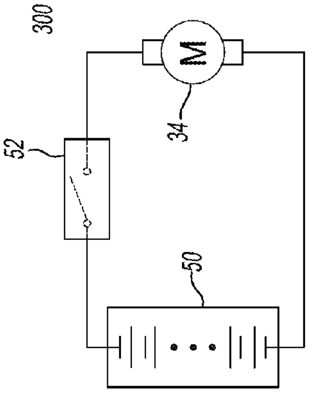
Fig-2 PRIOR ART
FIG. 2 is a simplified schematic of an example control circuit for the food waste disposer of FIG. 1.
Figure 5:
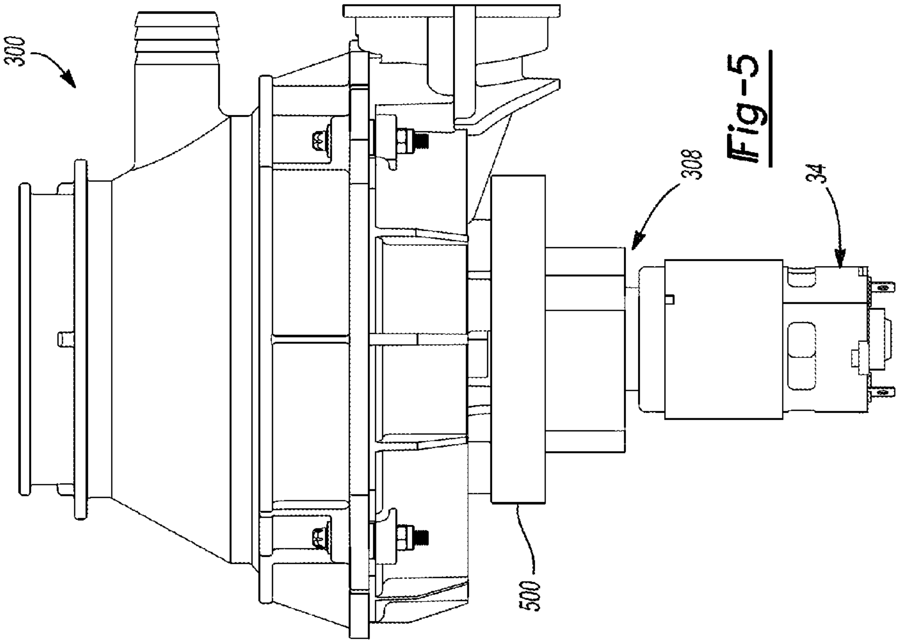
FIG. 5 is a perspective view of a food waste disposer in accordance with an aspect of the present disclosure with a flywheel disposed between the gear reduction mechanism and the rotatable shredder plate assembly.

With reference to FIG. 5, in an aspect, a flywheel 500 is disposed between and coupled to gear reduction mechanism 308 and rotatable shredder plate assembly 22 (FIG. 3) and is rotated by gear reduction mechanism 308 when output shaft 310 of gear reduction mechanism 308 is rotating. In an aspect, flywheel 500 is affixed to output shaft 310 of gear reduction mechanism 308, with output shaft 310 illustratively extending through flywheel 500. Flywheel 500 provides added rotational mass to the rotational mass provided by the rotatable shredder plate assembly 22. This added rotational mass provides added momentum to break through potential jams. In an aspect, flywheel 500 is utilized when gear reduction mechanism 308 does not have impact mechanism 400. It should be understood that flywheel 500 could also be utilized when gear reduction mechanism 308 has impact mechanism 400 with gear reduction mechanism 308 including impact mechanism 400 and flywheel 500 is affixed to output shaft 310. It should also be understood that flywheel 500 need not be utilized when gear reduction mechanism 308 does not have impact mechanism 400. It should also be understood that flywheel 500 could be used without gear reduction mechanism 308 being used.

Figure 6:
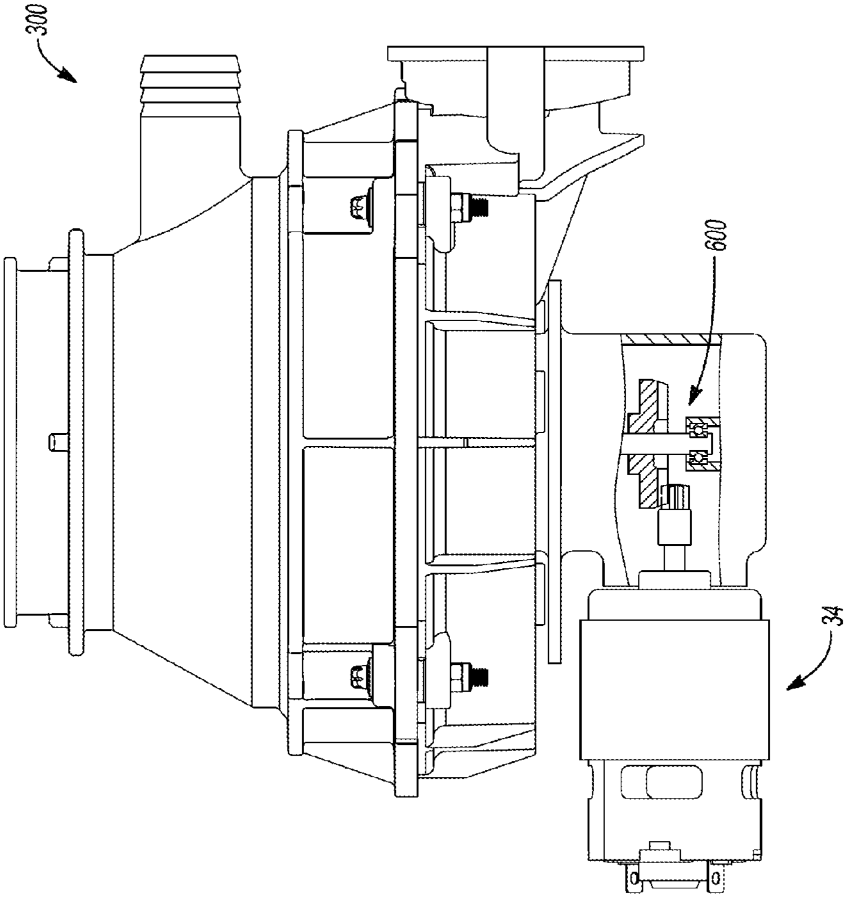
FIG. 6 is a perspective view of a food waste disposer in accordance with an aspect of the present disclosure with a right angle gear reduction mechanism.

With reference to FIG. 6, in an aspect, the gear reduction mechanism is an angled gear reduction mechanism 600, illustratively a right angle gear reduction mechanism, having an offset angle. Utilizing angled gear reduction mechanism 600 allows motor 34 to be offset to a side of the food waste disposer 300 at an angle to output shaft 310 of gear reduction mechanism 308, a right angle as shown in FIG. 6, reducing the overall height of food waste disposer 300. It should be understood that the offset angle of angled gear reduction mechanism 600 can be other than ninety degrees provided that it is a sufficient angle to output shaft 310 to allow motor 34 to be offset to a side of the food waste disposer 300. In this regard, as used herein, the offset angle means an angle sufficient to allow motor 34 to be offset to a side of the food waste disposer 300.

Figure 7:
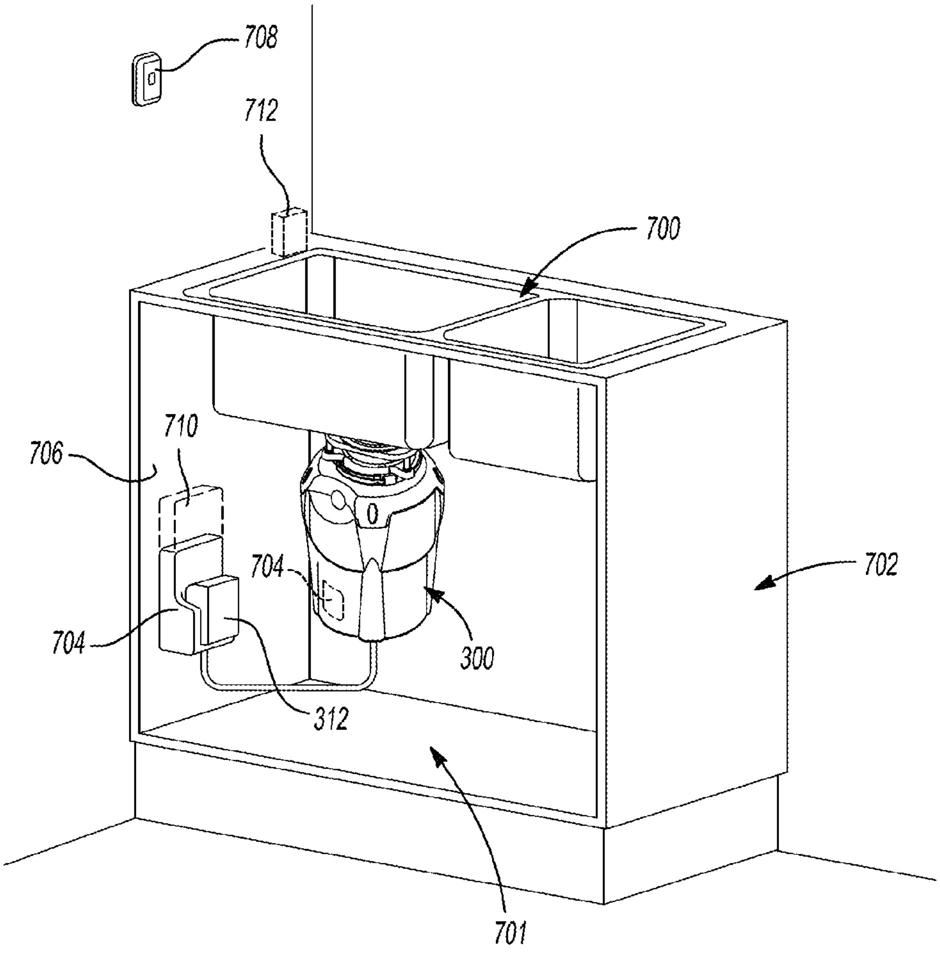
FIG. 7 is a perspective view of an installation of the food waste disposer of FIG. 3.

With reference to FIG. 7, a food waste disposer system 701 includes food waste disposer 300, a power module 704 and a wireless activator 708. Food waste disposer 300 is shown mounted underneath a sink 700 in a sink cabinet 702. In an aspect, power module 704 is disposed remotely from food waste disposer 300, such by being mounted on a wall 706 of sink cabinet 702. In an aspect, power module 704 is mounted on or in food waste disposer 300 as shown in phantom in FIG. 7.

Power module 704 is wired to food waste disposer 300, illustratively to motor 34 (not shown in FIG. 7). Rechargeable power source 312 such as battery 50 is received in power module 704 and in this aspect, power module 704 provides a battery docking station. Rechargeable power source 312 illustratively provides relatively low DC voltage, such as 12 VDC or 18 VDC. Thus, power module 704 is wired to food waste disposer 300 with low voltage wire. It should be understood that the DC voltage could be other than 12 VDC or 18 VDC.

Figure 8:
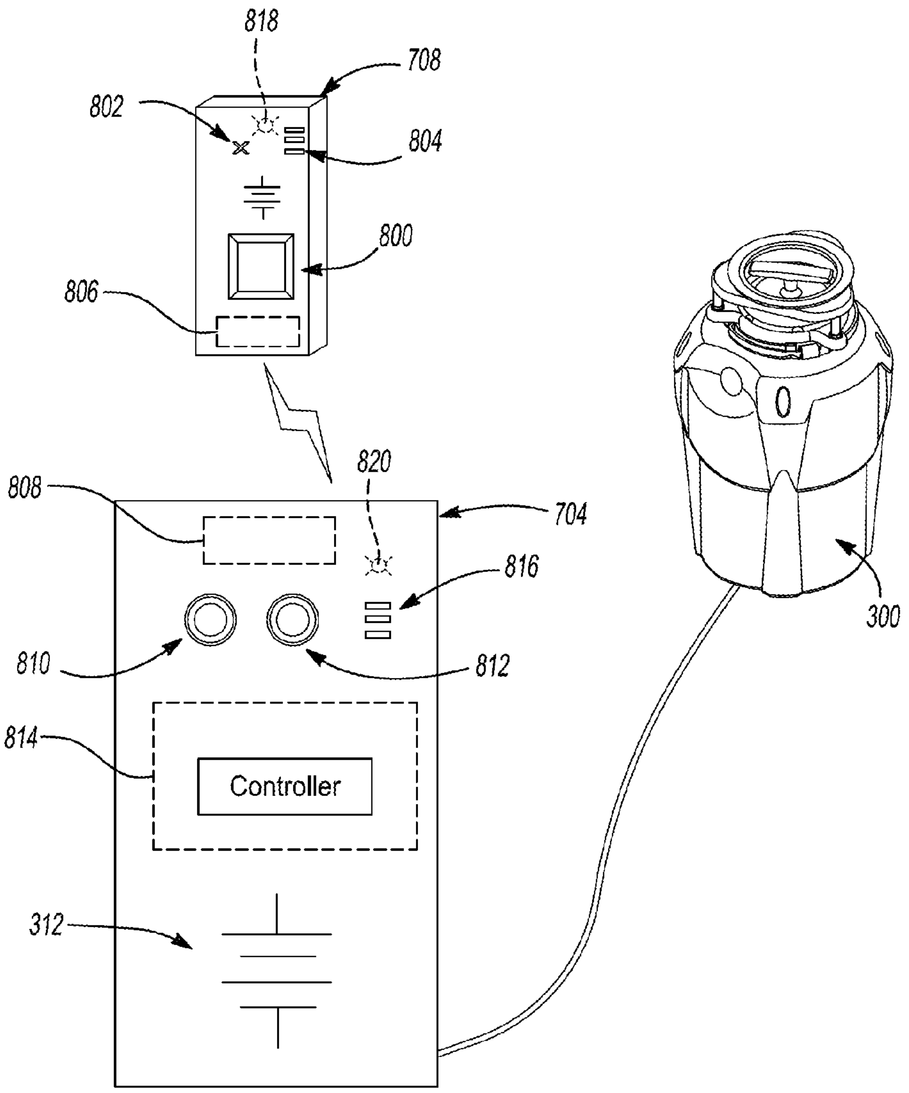
FIG. 8 is an electrical diagram showing the installation of FIG. 7.

With reference to FIGS. 7 and 8, food waste disposer 300 is illustratively activated/deactivated by wireless activator 708. Activator 708 includes an on/off switch 800 (FIG. 8), a reset indicator 802 a voltage level indicator 804 and a wireless communication unit 806. Power module 704 includes a wireless communication unit 808, reset button 810, on/off switch 812, controller 814 and voltage level indicator 816. Actuating on/off switch 800 turns food waste disposer 300 on and off. In an aspect, on/off switch is an on/off button. In this regard, if food waste disposer 300 is off when the on/off button is pressed, food waste disposer 300 is turned on and if food waste disposer 300 is on when the on/off button is pressed, food waste disposer 300 is turned off.

Wireless communication unit 806 of activator 708 communicates wirelessly with wireless communication unit 808 of power module 704 to send a message to wireless communication unit 808 of power module 704 that on/off button 800 has been actuated. Wireless communication unit 806 also receives messages from power module 704 sent by its wireless communication unit 808 that includes the status of reset indicator 802 (whether it should be illuminated or not) and a charge level of rechargeable power source 312 for causing voltage level indicator 804 to show the charge level of rechargeable power source 312. On/off switch 800 will flash while food waste disposer 300 is running indicating that food waste disposer 300 is on. On/off switch 812 of power module 704 can also be used to turn food waste disposer 300 on and off. When on/off switch 812 is used to turn food waste disposer 300 off, the voltage level indicator 816 on power module 704 will indicate the charge level of rechargeable power source 312. It should be understood that wireless communication unit 808 and controller 814 can be disposed within food waste disposer 300 instead of power module 704.

Figure 9:
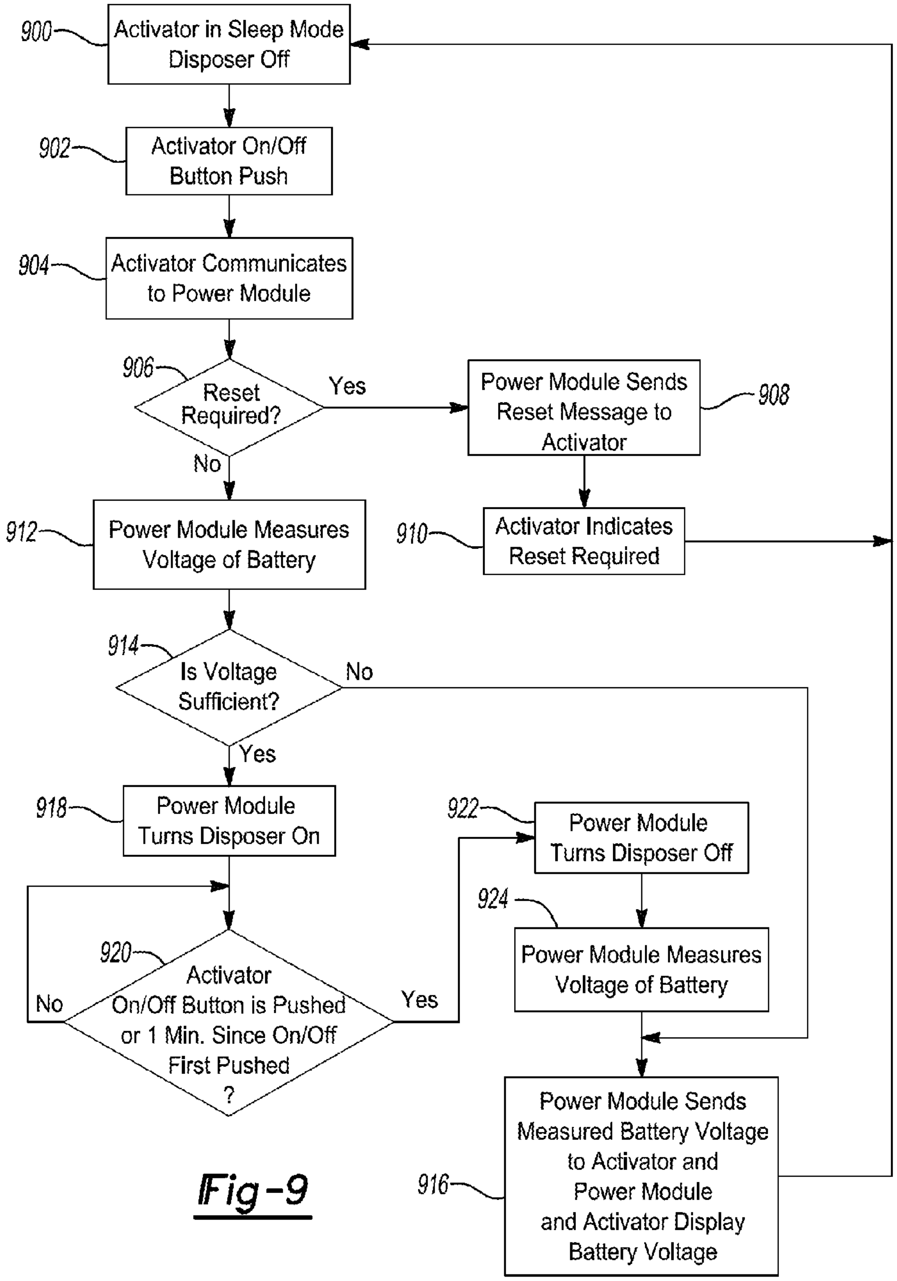
FIG. 9 is a flow chart of operation of the food waste disposer installation of FIG. 7.

FIG. 9 is a flow chart of an illustrative program for controlling food waste disposer 300, which is implemented in logic of controller 814, such as in software programmed in controller 814, and in logic of activator 708, as the following context dictates. In the context of the program of FIG. 9, on/off switch 800 is an on/off button and will be referred to as on/off button 800. At 900, activator 708 is in a “sleep” mode and food waste disposer 300 is off. At 902, on/off button 800 is pushed, which is communicated at 904 to power module 704 by wireless communication unit 806 of activator 708. At 906, the power module 704 determines if a reset is required. If so, at 908 power module 704 sends a message to activator 708 that a reset is required and at 910 activator 708 illuminates reset indicator 802 and the power module branches back to 900. In an aspect, power module 704 also includes a reset indicator (not shown) that is illuminated when a reset is required. The illumination of reset indicator 802 signals a user to press reset button 810 of power module 704. When reset button 810 is pushed, power module 704 communicates to controller 814 that a condition that caused the reset to be required has been cleared and the next time on/off button 800 of activator 708 or on/off button 810 of power module 704 is pushed, the power module 704 will determine that a reset is not required. A reset condition is caused when power module 704 determines that the current being drawn from rechargeable power source 312 exceeds predetermined parameters.

If at 906 the power module 704 determined that a reset wasn't required, at 912 the power module 704 measures the voltage of rechargeable power source 312. At 914, the power module 704 determines whether the voltage of rechargeable power source 312 is sufficient to run food waste disposer 300. If not, the power module 704 branches to 916 where the power module 704 sends a message with the measured voltage of rechargeable power source 312 to activator 708 that displays it on voltage level indicator 804. Power module 704 also displays the measured voltage of rechargeable power source 312 on voltage level indicator 816. The power module 704 then branches back to 900.

If at 914 the power module 704 determined that the voltage of rechargeable power source 312 was sufficient to run food waste disposer 300, at 918 the power module 704 turns food waste disposer 300 on by powering motor 34 of food waste disposer 300. At 920, the power module 704 checks whether On/Off button 800 has been pressed or a predetermined period of time has elapsed since food waste disposer 300 was turned on (such as one minute). If not, the power module 704 branches back to 920. If so, the power module 704 branches to 922 where it turns food waste disposer 300 off and then proceeds to 924 where it measures the voltage of rechargeable power source 312 and then proceeds to 916.

In an aspect, activator 708 instead of voltage level indicator 804, activator 708 has a single light 818 (shown in phantom in FIG. 8) that is illuminated when the voltage level of rechargeable power source 708 has fallen to a sufficiently low level that rechargeable power source 312 needs to be recharged. Similarly in an aspect, power module 704 instead of voltage level indicator 816 has a single light 820 (shown in phantom in FIG. 8) that is illuminated when the voltage level of rechargeable power source 708 has fallen to a sufficiently low level that rechargeable power source 312 needs to be recharged.

Figure 10:
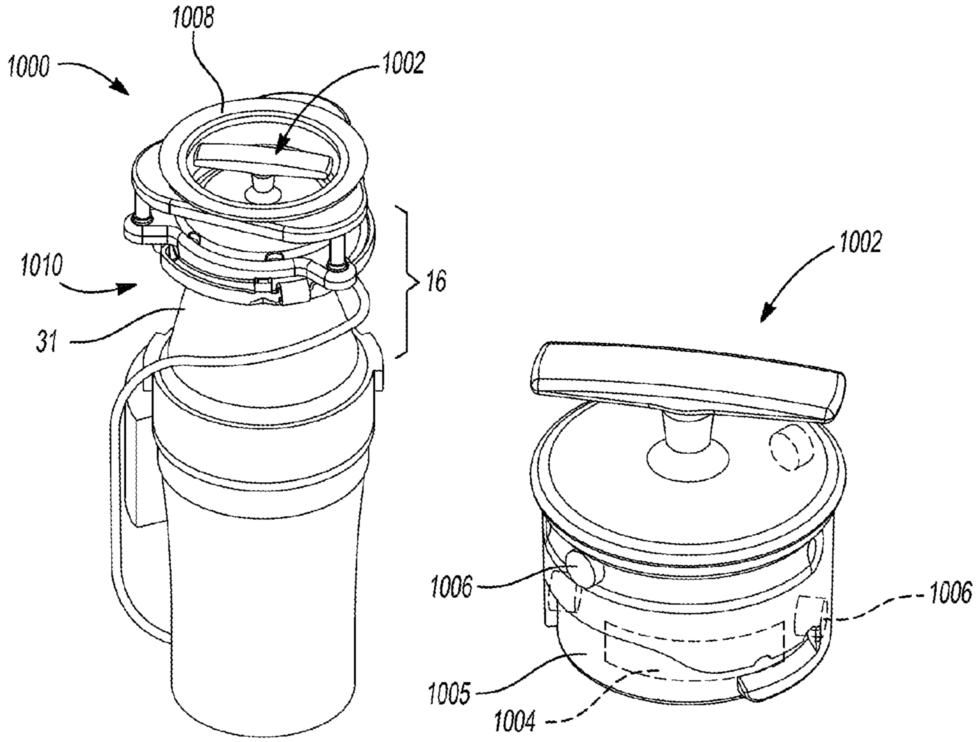
FIG. 10 is a perspective view of a batch feed food waste disposer powered by a rechargeable power source in which a stopper has the rechargeable power source in accordance with an aspect of the present disclosure.

Batch feed food waste disposers powered by household power (e.g., 120 VAC) in which a batch feed switch is activated by a stopper are known, such as the food waste disposer disclosed in U.S. Pat. Pub. 2014/0070036 for "Magnetically Activated Switch Assembly for Food Waste Disposer" published Mar. 13, 2014 ("'036 Pat. Pub."), the entire disclosure of which is incorporated by reference. With reference to FIG. 10, a food waste disposer 1000 powered through a stopper 1002 in accordance with an aspect of the present disclosure is a batch feed food waste disposer. In an aspect, except for being a batch feed food waste disposer and the additional differences discussed below, food waste disposer 1000 has the same components as food waste disposer 300. Stopper 1002 is used to activate a batch feed switch, such as the batch feed switch disclosed in the '036 Pat. Pub. Stopper 1002 has or is couplable to a power source that provides power to the motor of food waste disposer 1000. Stopper 1002 includes a body 1005 configured to be received in inlet housing 31 of food waste disposer 1000, or in a tube leading to inlet housing 31 from a sink flange 1008 used to mount food waste disposer 1000 to a sink. In this context, food waste inlet 1010 of good waste disposer 1000 is used to refer to inlet housing 31 or the tube leading to inlet housing 31 from sink flange 1008.

Body 1005 of stopper 1002 includes contacts 1006 that are coupled to the power source and that mate with corresponding contacts (not shown) of food waste disposer 1000 when stopper 1002 is in place. In a variation, food waste disposer 1000 does not include a batch feed switch. Rather, when stopper 1002 is in place and rotated to lock it, contacts 1006 contacting the corresponding contacts for food waste disposer 1000 activate food waste disposer 1000. The corresponding contacts of food waste disposer 1000 may be disposed in inlet housing 31 of food waste disposer 1000, or in a tube leading to inlet housing 31 from a sink flange 1008 used to mount food waste disposer 1000 to a sink.

In an aspect, the power source is a rechargeable power source 1004 and in an aspect, the rechargeable power source 1004 is disposed in body 1005 of stopper 1002. It should be understood, however, that rechargeable power source 1004 can be disposed remotely from stopper 1002 and stopper 1002 coupled to it by a cord, similar to what is described below but with the power source being rechargeable power source 1004.

Figure 11:
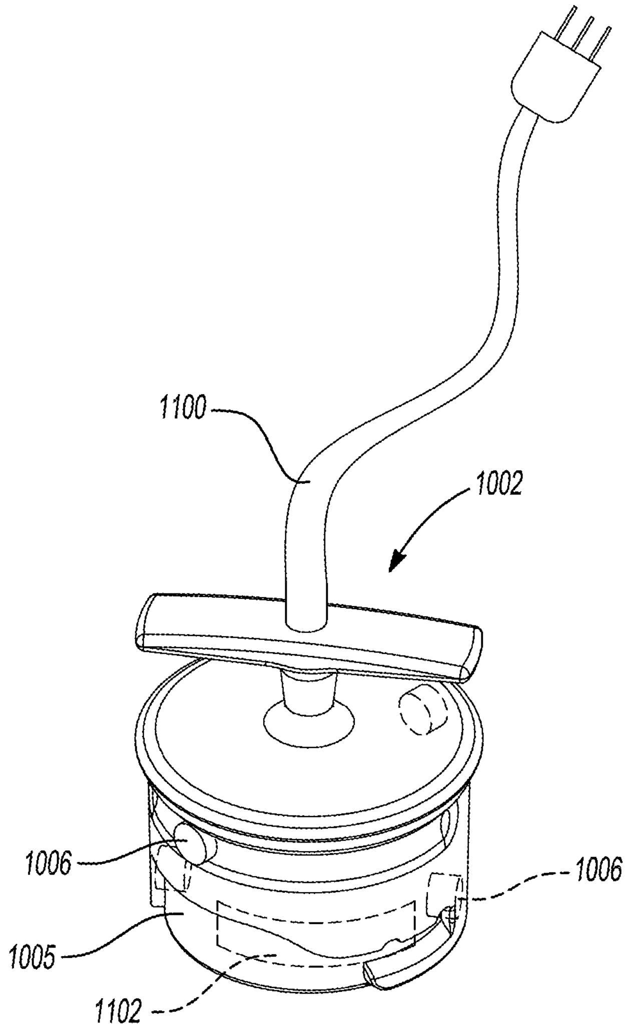
FIG. 11 is a perspective view of a batch feed food waste stopper in which a stopper includes or is coupled to a power source that provides power to the food waste disposer.

In an aspect, the power source is a source of household AC power, such as 120 VAC, and stopper 1002 has a cord 1100 (FIG. 11) having a plug that plugs into a wall outlet at which the AC power is provided. In an aspect, the motor of the food waste disposer 1000 is an AC motor and contacts 1006 of stopper 1002 are coupled to cord 1100. In an aspect, the motor of the food waste disposer 1000 is a DC motor. In an aspect, when the motor of the food waste disposer 1000 is a DC motor, stopper 1002 includes a DC power supply 1102 (shown in phantom in FIG. 11) coupled to contacts 1006 of stopper 1002 that provides DC power to contacts 1006. Alternatively, the DC power supply (not shown) is disposed in or mounted on food waste disposer 1000 and AC power is provided to the DC power supply via contacts 1006 of stopper 1002.

As discussed above, rechargeable power sources 312, 1004 can be a battery and can also be a rechargeable power source other than a battery. In an aspect, the rechargeable power source is an ultra-capacitor and in an aspect, the rechargeable power source is an ultra-capacitor battery hybrid. As used herein, an ultra-capacitor battery hybrid is a device that has an ultra-capacitor in parallel with a battery. If a rechargeable power source other than a battery such as an ultra-capacitor or ultra-capacitor battery hybrid is used to provide the power, power module 704 is then a docking station for that rechargeable power source in the aspect shown in FIG. 7. It should be understood that the term "rechargeable power source" includes any type of rechargeable power source that can be charged to store electrical power, including without limitation, batteries, ultra-capacitors and ultra-capacitor battery hybrids.

In an aspect, the rechargeable power source 312 used to provide the power to food waste disposer 300 or the rechargeable power source 1004 of stopper 1002 is charged by a separate charger that for example can be placed on a countertop and plugged into householder power. In this aspect, rechargeable power source 312 is removably receivable in power module 704. In an aspect the power module 704 includes a charger 710 (shown in phantom in FIG. 7), or is connected to charger 710, and the rechargeable power source 312 is charged in place in the power module 704 by the charger 710 which eliminates the need to remove the rechargeable power source from power module 704 to charge the rechargeable power source. In an aspect, the charger 710 is a trickle charger, rapid charger or fast charger.

In an aspect, charger 710 is a wireless charger, illustratively a wireless trickle charger, that converts for example radio frequency waves to DC power. An RF transmitter 712 (shown in phantom in FIG. 7) provides the RF to the wireless charger 710, and the RF transmitter 712 can then be located remotely from power module 704. For example, the RF transmitter 712 could be placed on the countertop of the sink cabinet (such as sink cabinet 702) in which power module 704 is mounted and plugged into household power, such as a wall outlet. By using a wireless charger, power module 704 can have a charger without the need to provide household power where the battery docking station is mounted, such as in sink cabinet 702.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention.

What is claimed is:

1. A food waste disposer system comprising:

a food waste disposer including a food conveying section, a motor section and a grind and discharge section, the food conveying section conveying food waste to a grind section of the grind and discharge section;

the grind section including a grind mechanism, the grind mechanism including a rotatable shredder plate assembly, the rotatable shredder plate assembly rotated by a motor of the motor section;

the motor comprising a permanent magnet direct current motor having a nominal no-load speed in the range of 15,000 revolutions per minute to 30,000 revolutions per minute;

the motor section including a gear reduction mechanism coupling the rotor shaft to the rotatable shredder plate assembly, the gear reduction mechanism having an input/output gear reduction ratio in a range of 4.3-30 to 1 wherein the nominal no-load speed of the motor and the input/output ratio of the gear reduction mechanism are configured so that an output shaft of the gear reduction mechanism rotates in a range of 1,000 revolutions per minute to 3,500 revolutions per minute when the motor is running at its nominal no-load speed; and a rechargeable power source that provides power to the motor.

2. The food waste disposer system of claim 1 wherein the gear reduction mechanism includes an impact mechanism.

3. The food waste disposer system of claim 2 wherein the impact mechanism is configured to activate when the rotating shredder plate assembly is stopped in a jam condition.

4. The food waste disposer system of claim 2 including a flywheel disposed between and coupled to the gear reduction mechanism and the rotatable shredder plate assembly.

5. The food waste disposer system of claim 1 including a flywheel disposed between and coupled to the gear reduction mechanism and the rotatable shredder plate assembly.

6. The food waste disposer system of claim 1 wherein the gear reduction mechanism is an angled gear reduction mechanism having an offset angle and the motor is offset to a side of the food waste disposer at the offset angle to the output shaft of the gear reduction mechanism.

7. The food waste disposer system of claim 1 wherein the permanent magnet direct current motor is any of a motor having a wound rotor and a stator with permanent magnets and a brushless direct current motor having a wound stator and a rotor with permanent magnets.

8. The food waste disposer system of claim 1 wherein the rechargeable power source is at least one of a battery, ultra-capacitor and an ultra-capacitor battery hybrid.

9. The food waste disposer system of claim 1 including a charger coupled to the rechargeable power source.

10. The food waste disposer of claim 9 wherein the charger is a wireless charger.

11. The food waste disposer system of claim 1 including a power module and a wireless activator;

the power module wired to the motor, the power module having the rechargeable power source received therein, the power module further having a wireless communication unit;

the wireless activator including a wireless communication unit;

the wireless communications unit of the wireless activator and the wireless communications unit of the power module in wireless communication with each other;

the wireless activator including an on/off switch; and the power module turning the food waste disposer on and off in response to actuation of the on/off switch of the wireless activator wherein upon the on/off switch of the wireless activator being actuated, the wireless communication unit of the wireless activator communicating wirelessly with the wireless communication unit of the power module to send a message that the on/off switch of the wireless activator was actuated.

12. The food waste disposer system of claim 11, wherein if the food waste disposer is off when the on/off switch of the wireless activator is actuated, the power module determines if a reset is required and upon determining that a reset is required, sends a message to the wireless activator that the reset is required and the wireless activator illuminates a reset indicator upon receipt of the message that the reset is required and the power module does not turn the food waste disposer on.

13. The food waste disposer system of claim 12 wherein upon determining that the reset is not required, the power module measures a voltage level of the rechargeable power source and determines whether the voltage level of the battery is sufficient to run the food waste disposer and turns the food waste disposer on only if the voltage level of the rechargeable power source is sufficient to run the food waste disposer.

14. The food waste disposer system of claim 13 wherein after turning the food waste disposer on, the power module turns the food waste disposer off upon the on/off switch of the wireless activator being actuated or after a lapse of a predetermined period time.

15. The food waste disposer system of claim 14 wherein the on/off switch is an on/off button and the power module toggles the food waste disposer on and off in response to the on/off button being pressed.

16. The food waste disposer system of claim 14 wherein the wireless activator includes a rechargeable power source voltage level display and upon turning the food waste disposer off, the power module sends the measured rechargeable power source voltage level to the wireless activator and the wireless activator displays the measured battery voltage on the battery voltage level display.

17. The food waste disposer system of claim 16 wherein the power module also includes a rechargeable power source voltage level display on which it displays the measured rechargeable power source voltage level.

18. The food waste disposer system of claim 11 wherein the power module also includes an on/off switch and the power module also turns the food waste disposer on and off upon the on/off switch of the power module being actuated.

19. The food waste disposer system of claim 18 wherein the on/off switch is an on/off button and the power module toggles the food waste disposer on and off in response to the on/off button being pressed.

20. The food waste disposer system of claim 11 wherein the rechargeable power source is at least one of a battery, ultra-capacitor and an ultra-capacitor battery hybrid.

21. The food waste disposer system of claim 11 including a charger coupled to the rechargeable power source.

22. The food waste disposer system of claim 21 wherein the charger is a wireless charger.

23. The food waste disposer system of claim 11 wherein the rechargeable power source is removably receivable in the power module.

24. The food waste disposer system of claim 11 wherein the power module is disposed remotely from the food waste disposer.

25. The food waste disposer system of claim 11 wherein the power module is mounted on or in the food waste disposer.

26. The food waste disposer system of claim 1 including a stopper having a body configured for receipt in a food waste inlet of the food waste disposer, the rechargeable power source disposed in the body of the stopper and providing power to the motor of the food waste disposer when the stopper is received in the food waste inlet of the food waste disposer.

27. The food waste disposer system of claim 26 wherein the rechargeable power source is at least one of a battery, an ultra-capacitor and an ultra-capacitor battery hybrid.

* * * * *